United States Patent [19]
Ito et al.

[11] Patent Number: 5,765,931
[45] Date of Patent: Jun. 16, 1998

[54] VEHICLE DECELERATION AND VEHICLE SPEED PRESUMPTION SYSTEMS FOR MOTOR VEHICLE, AND ANTISKID BRAKE SYSTEM EMPLOYING THEM

[75] Inventors: Shouji Ito; Hideyuki Aizawa, both of Susono, Japan

[73] Assignee: Toyota Jidosha Kabushiki Kaisha, Toyota, Japan

[21] Appl. No.: 631,093

[22] Filed: Apr. 12, 1996

[30] Foreign Application Priority Data

Apr. 25, 1995  [JP]  Japan ................................. 7-101044

[51] Int. Cl.$^6$ ........................................... B60T 8/58
[52] U.S. Cl. ................................. 303/183; 303/185
[58] Field of Search .......................... 303/171, 172, 303/173, 183, 184, 185, DIG. 5; 364/424.015, 426.024

[56] References Cited

U.S. PATENT DOCUMENTS

| | | | |
|---|---|---|---|
| 4,395,761 | 7/1983 | Sato et al. | 303/183 |
| 4,769,758 | 9/1988 | Masaki et al. | 303/157 |
| 5,012,417 | 4/1991 | Watanabe et al. | 303/184 |
| 5,123,714 | 6/1992 | Mori | 303/199 |
| 5,187,666 | 2/1993 | Watanabe | 303/139 |
| 5,522,652 | 6/1996 | Negrin et al. | 303/177 |

FOREIGN PATENT DOCUMENTS

A-1-145253  6/1989  Japan.
A-4-293651  10/1992  Japan.

*Primary Examiner*—Chris Schwartz
*Attorney, Agent, or Firm*—Oliff & Berridge, PLC

[57] ABSTRACT

As illustrated in FIG. 1, the wheel accelerations of the respective wheels are calculated from the detected wheel speeds, variations in the wheel accelerations are calculated from these wheel accelerations, the cumulative sums of the variations in the wheel accelerations are calculated from these variations, and the presumptive vehicle deceleration is calculated from the cumulative sums, whereby the vehicle deceleration can be accurately presumed without employing an acceleration sensor or the like. Further, the presumptive vehicle speed is calculated accurately using the presumptive vehicle deceleration. Still further, the slip factors of the respective wheels are calculated from the differences between the presumptive vehicle speed and the wheel speeds so as to perform an antiskid brake control at low cost and at a high precision.

11 Claims, 12 Drawing Sheets

VEHICLE DECELERATION AND VEHICLE SPEED PRESUMPTION SYSTEMS FOR MOTOR VEHICLE, AND ANTISKID BRAKE SYSTEM EMPLOYING THEM

BACKGROUND OF THE INVENTION

1. Field of the Invention

The present invention relates to systems for presuming the vehicle deceleration and vehicle speed of a motor vehicle. It also relates to an antiskid brake system employing the presumption systems.

2. Description of the Prior Art

It has been well known that, when the wheels of a motor vehicle have locked in a sudden braking mode the road surface conditions influence the braking distance of the motor vehicle and the directional stability thereof. With the intention of eliminating the drawbacks, there have been proposed antiskid brake systems in each of which the tendency of the wheels to lock or the tendency thereof to recover from the lock is detected so as to adjust the braking forces of the brakes, thereby to control the slip factors of the wheels in the braking mode. These systems have already been extensively put into practical use.

When carrying out an antiskid brake control, the lock or slips of the wheels needs to be detected. Therefore, it is necessary detect both the vehicle speed or car body speed of the motor vehicle (the ground speed of the motor vehicle) and the wheel speeds of the wheels with high precision.

In a case where the motor vehicle is a two-wheel drive, ordinarily, in the braking mode, the wheel speeds of the driven wheels before the antiskid brake control correspond favorably to the vehicle speed (except on a special occasion to be stated later). Accordingly any serious problem in determining vehicle speed is not particularly incurred. In contrast, in the case of a four-wheel drive motor vehicle, the wheel speeds and the vehicle speed are not always correlative. By way of example, therefore, a method is adopted in which the wheel speed of the wheel rotating fastest among the four wheels is presumed as the vehicle speed.

Even in this case, however, there is a problem as explained below. In the four-wheel drive motor vehicle the four wheels are joined by any form (for example, by direct connection form or by coupling form). Accordingly, when one front wheel (or two front wheels) has (have) undergone a slip (slips) by way of example, the rear wheels tend to similarly slip under the influence of the slip (slips) of the front wheel (wheels). When the wheel speeds of the four wheels have simultaneously lowered in this manner, the presumptive vehicle speed is also lowered. This sometimes results in the judgement that the vehicle speed and the highest wheel speed have no difference (that the wheels have no slip), so the entrance into the antiskid brake control delays.

In order to eliminate the above problem, there has heretofore been proposed a method wherein the maximum assumable deceleration of the motor vehicle is previously set as a guard value, and wherein when a vehicle deceleration calculated on the basis of the wheel speed has exceeded the guard value, it is determined that the tendency of the four wheels is to lock and a value which is smaller than the last presumptive vehicle speed by a vehicle speed corresponding to the maximum vehicle deceleration (the guard value) is adopted as a new presumptive vehicle speed. This method has also been extensively put into practical use.

According to this method, in the case where the wheel speed has lowered in excess of the guard value, a difference arises between the wheel speed and the vehicle speed presumed on the basis of the guard value, and hence, the occurrence of the slip can be judged owing to the difference. The braking mode is therefore permitted to quickly enter into the antiskid brake control.

Further, Japanese Patent Application Laid-Open No. 293651/1992 etc. has proposed a method wherein an acceleration switch (or acceleration sensor) is mounted in addition to the wheel speed sensors of the four wheels, and wherein the vehicle speed is presumed more accurately owing to such a combination.

The prior-art methods are still problematic as explained below.

The method wherein the vehicle speed is presumed on the basis of a predetermined (fixed) guard value when the vehicle deceleration based on the wheel speed has become greater than the guard value outlined above, can reduce the cost of the system because no acceleration sensor is required. Naturally, however, the actual vehicle deceleration of the motor vehicle is not in agreement with the guard value. This leads to the problem that the vehicle speed cannot be accurately presumed. If the vehicle speed cannot be accurately presumed, the difference between the vehicle speed and the wheel speed (namely, the slip factor or slip rate) cannot be accurately presumed, either. As a result, the antiskid brake control based on the slip factor cannot be accurately performed.

Moreover, the guard value is generally set at a deceleration magnitude in excess of which the vehicle speed will never be lowered in consideration of various road-surface situations, drive conditions of motor vehicle, etc. In actuality, the guard value becomes considerably larger.

The above method has the problem that the very slow braking mode of the motor vehicle on a road of very low friction sometimes fails to enter into the antiskid brake control. The first reason for this is that the highest wheel speed usually lowers simultaneously with the braking mode and the presumptive vehicle speed calculated on the basis of the wheel speed lowers to exhibit no difference from this wheel speed, so the slip of the corresponding wheel cannot be judged. The second reason for the problem is that, in spite of the lowering of the highest wheel speed, the deceleration corresponding thereto is not very great and does not exceed the guard value (set larger). Thus the operation of the method does not change over to calculate the presumptive vehicle speed by the use of this guard value.

On the other hand, the method wherein the acceleration switch (or acceleration sensor) is mounted in the motor vehicle can detect the actual vehicle deceleration and can therefore presume the vehicle speed comparatively accurately. However, the acceleration sensor is very expensive and the rise in cost becomes great when installing the antiskid brake system in the motor vehicle.

SUMMARY OF THE INVENTION

The present invention has been made in view of the problems of the prior art as stated above. It has objects to realize the presumption of a vehicle deceleration with high precision without employing an acceleration switch (or acceleration sensor) and to consequently realize the presumption of a vehicle speed with high precision, thereby permitting an antiskid brake control of high precision and low cost.

The present invention has achieved these objects by adopting structures as defined below.

In operation, the equation of motion of each of the wheels in the braking mode of a motor vehicle can be indicated as the following equation (1):

$$I \cdot d\omega = \mu \cdot r \cdot W - TB \quad (1)$$

where I: moment of inertia,
ω: angular velocity of the wheel,
dω: angular acceleration of the wheel,
μ: friction coefficient of a road surface,
r: effective diameter of a tire,
W: load per wheel,
TB: braking torque.

It is now assumed that, when the brake is stepped on, a braking hydraulic pressure P rises at a rate of P1 [kgf/cm²/s] as shown in FIG. 3. On this occasion, the braking torque TB increases in proportion to the braking hydraulic pressure P. In addition, the reaction force (μ·r·W) of the road surface on which the motor vehicle is traveling changes along the curve of so-called "μ-S characteristics" which stands for road-surface friction coefficient μ-slip factor S characteristics, as shown in FIG. 2.

In general, the inflection point of the characteristics as indicated by a point Q in FIG. 2 is existent in the curve of the μ-S characteristics. The inflection point Q of the characteristics often forms a "peak" as illustrated in FIG. 2. Some road-surface friction coefficients μ, however, merely change in slopes (gradients) without forming any peak.

When the μ-S characteristics are now separated into a section A up to the inflection point Q of the characteristics and a section B behind the inflection point Q thereof, they can be interpreted as stated below.

In the section A, the reaction force (μ·r·W) of the road surface rises along the μ-S curve shown in FIG. 2, and the rising rate thereof is proportional to the rising rate of the braking hydraulic pressure P.

Here, when Eq. (1) is differentiated, the following equation (2) is obtained:

$$I \cdot dd\omega = r \cdot W \cdot d\mu - dTB \quad (2)$$

Regarding section A, when symbols Vw and dVw respectively denote the wheel speed and wheel acceleration of the pertinent wheel and variations in the individual elements are respectively expressed by affixing symbols Δ, relationships indicated by the following equation (3) can be derived:

$$\Delta Vw \propto \Delta d\omega \propto I \cdot dd\omega \propto (r \cdot W \cdot d\mu - dTB) \propto dTB \propto \Delta TB \quad (3)$$

That is, the variation ΔdVw in the wheel acceleration dVw is proportional to the variation ΔTB in the braking torque TB. The relationships thus far explained apply to every wheel.

Meanwhile, a variation ΔG in the vehicle deceleration (or car body deceleration) G of the motor vehicle can be calculated by assuming the same dynamical environments of all the wheels, as follows:

$$\Delta G = \Delta F / W0 \quad (4)$$

where ΔF: summation of variations in braking forces,
W0: gross weight of the motor vehicle.

The summation ΔF of the variations in the braking forces can be calculated using the following equation (5):

$$\Delta F = \Delta T / r \quad (5)$$

where ΔT: summation of variations ΔTB in the braking torques TB of the four wheels, (ΔTB FR+ΔTB FL+ΔTB RR+ΔTB RL).

Incidentally, letters "FR", "FL", "RR" and "RL" are used as abbreviations for the right front wheel, left front wheel, right rear wheel and left rear wheel, respectively.

The following equation (6) is derived from Eqs. (4) and (5):

$$\Delta G = \Delta F / W0 = (\Delta T/r)/W0 \propto \Delta T \quad (6)$$

Since ΔTB ∝ ΔdVw is held in view of Eq. (3), the variation ΔG becomes:

$$\Delta G \propto \Delta T = (\Delta TB\ FR + \Delta TB\ FL + \Delta TB\ RR + \Delta TB\ RL) \propto (\Delta VwFR + \Delta VwFL + \Delta VwRR + \Delta VwRL) \quad (7)$$

Eventually, the following equation (8) is held:

$$\Delta G \propto (\Delta dVwFR + \Delta dVwFL + \Delta dVwRR + \Delta dVwRL) \quad (8)$$

On the basis of the idea explained above, the present invention as defined in Claim 1 presumes the vehicle deceleration G within the section A based on the cumulative sums of the variations ΔdVw in the wheel accelerations dVw.

While several practicable techniques for calculating the vehicle deceleration G are considered, one example thereof will now be explained. As illustrated in FIG. 4, the variations ΔdVw in the wheel accelerations dVw of the respective wheels are found on the basis of, for example, the following equations (9) every calculating cycle t0 of the wheel speeds Vw:

$$\Delta dVwFR(n) = dVwFR(n) - dVwFR(n-1)\ \Delta dVwFL(n) = dVwFL(n) - dVwFL(n-1)\ \Delta dVwRR(n) = dVwRR(n) - dVwRR(n-1)\ \Delta dVwRL(n) = dVwRL(n) - dVwRL(n-1) \quad (9)$$

As stated before, the letters "FR", "FL", "RR" and "RL" are abbreviations for the right front wheel, left front wheel, right rear wheel and left rear wheel, respectively. Symbols (n) and (n−1) denote the time points of the calculations, respectively.

The variations ΔdVw in the wheel accelerations dVw of the individual wheels as given by Eqs. (9) are added up for the same wheels on the basis of the following equations (10), thereby to obtain the cumulative-sums "g" of the variations ΔdVw in the wheel accelerations dVw, respectively:

$$gFR(n) = gFR(n-1) + \Delta dVwFR(n)\ gFL(n) = gFL(n-1) + \Delta dVwFL(n)\ gRR(n) = gRR(n-1) + \Delta dVwRR(n)\ gRL(n) = gRL(n-1) + \Delta dVwRL(n) \quad (10)$$

The present invention evaluates the vehicle deceleration G on the basis of, the cumulative-sums g of the variations ΔdVw in the wheel accelerations dVw, as indicated in Eqs. (10). Incidentally, hereinafter the cumulative-sums g of the variations ΔdVw will merely be called "variational-sums g".

Fundamentally, if the dynamical environments of the individual wheels are the same, a value obtained by simply adding up the variational-sums g of all the wheels is substantially proportional to the vehicle deceleration G as indicated by the following equation (11), and hence, the vehicle deceleration G may be evaluated on the basis of Eq. (11):

$$G(n) \propto (gFR(n) + gFL(n) + gRR(n) + gRL(n)) \quad (11)$$

In order to more enhance the precision of the evaluation, however, the vehicle deceleration G may well be calculated after the variational-sums g of the individual wheels have been subjected to predetermined weighting (for example, weighting in which the magnitudes of the loads borne by the respective wheels, or the braking characteristics of the respective wheels are considered). In the present invention, how the variational-sums g of Eqs. (10) are concretely utilized for the presumption of the vehicle deceleration G is not especially restricted.

Incidentally, in a case where the wheel acceleration variational cumulative-sum calculation means (the variational-sums g calculation means) includes filtering means, and where it performs filtering in calculating the variational-sums g, the difference between the response rate of the change of the vehicle speed and that of the wheel speed can be favorably corrected.

In a case where the vehicle deceleration presumption system defined in Claim 1 further comprises means for judging whether or not the wheel acceleration is minus, and means for judging whether or not the variation in the wheel acceleration is minus, and in a case where the vehicle deceleration is presumed only when wheel accelerations are minus with the wheel acceleration variations being also minus, the vehicle deceleration is calculated only when the wheel accelerations affects this vehicle deceleration. Therefore, a computational burden on the computer system can be relieved, and noise components (for example, vibrations ascribable to inputs from the road surface and to the elastic re-formation of the rubber of the tire) can be effectively excluded, so that the vehicle deceleration can be presumed at a high precision accordingly.

When the vehicle deceleration presumption system further comprises means for storing and updating the peak of the wheel acceleration on the minus side thereof, and in a case where in calculating the variational-sums of the wheel accelerations, only variation data taken in the state in which the variation in the wheel acceleration is minus and in which the current wheel acceleration has a value smaller than the minus side peak of the wheel acceleration stored and updated before (in other words, in which the current wheel acceleration has an absolute value greater than before being updated) is used as data for the calculation of the variational-sums, noise components of vibration can be eliminated, and hence, the vehicle deceleration can be presumed more accurately.

Further, in a case where, upon the judgement that the wheel acceleration has become plus, by the means for judging whether or not the wheel acceleration is minus, the variational-sums of the wheel acceleration calculated before are reset, the influences of vibrations ascribable to the elastic re-formation of the rubber of the tire, etc. can be excluded, and it is possible to presume a vehicle deceleration more accurately.

The present invention consists in that the presumptive vehicle speed of the motor vehicle is calculated using the vehicle deceleration presumed in the above way. As a result, information on the actual vehicle deceleration can be incorporated in the vehicle speed calculation so as to obtain an accurate presumptive vehicle speed without using an acceleration switch or an acceleration sensor.

Incidentally, how the presumptive vehicle deceleration obtained by the foregoing method is used for the calculation of the presumptive vehicle speed of the motor vehicle is not especially restricted in the present invention defined in Claim 7. Considered as a practicable method is an example in which, within the section A shown in FIG. 2, the basic vehicle speed is evaluated on the basis of the wheel speeds in the same way as in the prior art, and the presumptive vehicle deceleration obtained is utilized as so-called "guard values" for prescribing the upper and lower limits of the vehicle speed. An alternative example considered is such that, when the vehicle speed within the section B is to be presumed, the presumptive vehicle deceleration obtained is utilized (instead of the guard value which is the fixed value in the prior art).

More specifically, the presumptive vehicle deceleration obtained can also be utilized in, for example, a method in which the system further comprises means for judging whether or not the inflection point of μ-S characteristics has been exceeded from the variation in the wheel acceleration, and in which, upon the judgement that the inflection point of the characteristics has been exceeded, the presumption of the vehicle speed is changed-over so as to be done using the presumptive vehicle deceleration obtained. Thus, particularly the vehicle speed within the section B can be presumed more accurately than in the prior art and the antiskid brake control of the motor vehicle is reliably performed even in the case of the simultaneous locking of the four wheels in the very slow braking mode of the vehicle on a road of very low friction.

Incidentally, the search for the inflection point of the μ-S characteristics from the variation in the wheel acceleration is based on a technical idea as explained below.

Referring to FIG. 2 again, in the section B shown in FIG. 2, in other words, behind the inflection point Q of the μ-S characteristics, the road-surface reaction force μ·r·W changes along the μ-S curve because a quantity r·W is considered to be substantially constant. Herein, since the friction coefficient μ decreases behind the inflection point Q of the characteristics, also the value of the reaction force μ·r·W decreases. In consequence, the difference between the terms μ·r·W and TB in Eq. (1) enlarges abruptly behind the inflection point Q of the characteristics (at the peak of the friction coefficient μ).

Accordingly, the value of the quantity dω (∝μ·r·W−TB) enlarges behind the inflection point Q of the characteristics, and also the value of the wheel acceleration dVw enlarges in proportion thereto. For this reason, whether or not the inflection point Q of the characteristics has been exceeded can be judged in such a way that the variation ΔdVw in the wheel acceleration dVw is monitored to find out the point at which it enlarges abruptly.

In this way, the present invention defined in Claim 8 judges whether or not the inflection point of the characteristics has been exceeded, and presumes the vehicle speed by the use of the vehicle deceleration presumed in accordance with the foregoing method after the judgement that the inflection point has been exceeded. That is, before the inflection point of the characteristics is exceeded, the highest wheel speed is set as the vehicle speed in accordance with the same method as in the prior art by way of example. At the stage at which the inflection point of the characteristics has been exceeded, the vehicle speed is presumed using the actually presumed vehicle deceleration instead of the (fixed) guard value in the prior art. Thus, the computation can be simplified and facilitated, and particularly the vehicle speed behind the inflection point of the characteristics can be presumed more accurately than in the prior art.

As a result, even in a case where the vehicle deceleration itself is not great enough to exceed the guard value in the prior art, the presumption of the vehicle speed can be changed-over so as to use the presumptive vehicle deceleration behind the inflection point of the characteristics. Accordingly, even in a case where the simultaneous lock of the four wheels occurs in the very slow braking mode of the vehicle drive on the road of very low friction, the vehicle speed can be presumed appropriately.

Herein, in a case where the vehicle speed presumption system further comprises means for judging whether or not the variation in the wheel acceleration is plus, and where, upon the judgement that the wheel acceleration variation has become plus, the variational-sums of the wheel acceleration generated after the changeover to the presumption of the vehicle speed using the presumptive vehicle deceleration are reset. The return of the vehicle drive to the situation before the inflection point of the characteristics can be judged accurately from the tendency of the wheel acceleration to increase and the changeover of the presumptive vehicle speeds before and behind the inflection point of the characteristics can be smoothly effected.

Further, in a case where the vehicle speed presumption system further comprises means for detecting the peaks of the absolute values of the wheel acceleration on the plus side and minus side thereof, and where, when the absolute value of the plus side peak has become greater than that of the minus side peak, the vehicle speed presumption using the presumptive vehicle deceleration is suspended, it can be accurately detected that the wheel acceleration has been recovered to the increasing side truly, not by the vibrations of the tire etc.. Hence, the presumption of the vehicle speed can be quickly returned to the more accurate method.

Moreover, in a case where the system further comprises slip factor (rate) calculation means for calculating the slip factors (rates) of the respective wheels from the vehicle speed and wheel speeds presumed as explained above, and braking force control means for controlling the braking forces of the respective wheels in accordance with the slip factors, an antiskid brake control system of low cost and high precision can be provided. Additionally the vehicle speed can be accurately detected (without the acceleration switch or acceleration sensor) so as to appropriately control the braking hydraulic pressures even when the four wheels of the motor vehicle have simultaneously locked.

In addition, all the four wheels can lock not only in the motor vehicle of four-wheel drive, but also in the motor vehicle of two-wheel drive, for example, on a road with very low friction. As a matter of course, the present invention is also applicable to a motor vehicle of the two-wheel drive.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

Now, an embodiment of the present invention will be described in detail with reference to the drawings.

Figure 5:
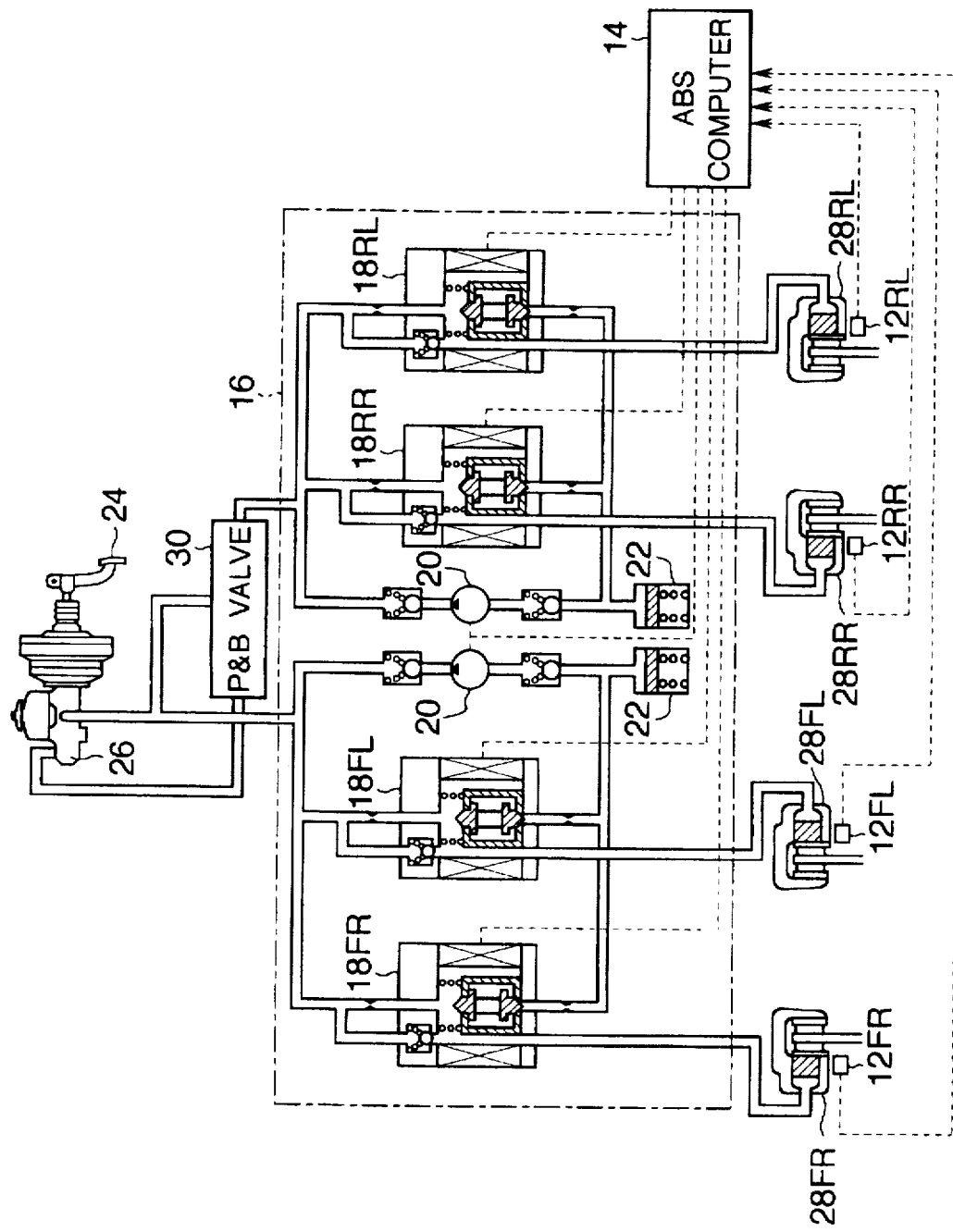
FIG. 5 is a schematic constructional view showing an antiskid brake system for a motor vehicle to which the present invention is applied.

FIG. 5 illustrates an antiskid brake system (ABS) for a motor vehicle to which the present invention is applied.

Referring to FIG. 5, symbols 12 (12FR, 12FL, 12RR and 12RL) denote wheel speed sensors for detecting the wheel speeds Vw of the respective wheels (not shown) of the motor vehicle. Numeral 14 designates an ABS computer. The ABS computer 14 calculates the presumptive vehicle deceleration G and presumptive vehicle speed $V_{SO}$ of the motor vehicle on the basis of information items delivered from the wheel speed sensors 12, in accordance with methods to be explained later. When the difference (the slip factor) between the presumptive vehicle speed $V_{SO}$ and the wheel speed Vw has been detected as being a predetermined value or more, an antiskid brake control is executed by an ABS actuator (braking force control means) 16.

The ABS actuator 16 includes three-position solenoid valves 18 (18FR, 18FL, 18RR and 18RL), pumps 20 and reservoirs 22.

In the ordinary braking mode of the drive of the motor vehicle (that is, while the antiskid brake control is not executed), each of the three-position solenoid valves 18 is not supplied with a control signal from the ABS computer 14. In this condition, the tree-position solenoid valves 18 connects the corresponding one of wheel cylinders 28 (28FR, 28FL, 28RR and 28RL) with a master cylinder 26. Incidentally, a known "P&B" (proportioning and bypass) valve 30 is interposed between the master cylinder 26 and the three-position solenoid valves 18RR, 18RL in pipes which lead to the rear side of the motor vehicle. Numeral 24 in the figure indicates a brake pedal.

Next, the operation of the antiskid brake system will be briefly described. When the brake pedal 24 has been trodden in, oil is fed from the master cylinder 26 into the individual wheel cylinders 28 through the corresponding three-position solenoid valves 18, whereby the respective wheels are braked. On the other hand, when the brake pedal 24 has been released, the oil in the wheel cylinders 28 is fed back into the master cylinder 26.

During the operation of the antiskid brake control, when the ABS computer 14 has judged from the signal of any of the wheel speed sensors 12 that the slip factor of the corresponding wheel has become the predetermined value or more (in other words, that the corresponding wheel is about to lock), the corresponding three-position solenoid valve 18 cuts off the side of the master cylinder 26 in accordance with a control signal delivered from the ABS computer 14. The corresponding wheel cylinder 28 is brought into communication with the reservoir 22 so that a pressure reduction control is executed. On this occasion, the pump 20 is driven by a control signal delivered from the ABS computer 14, whereby the oil having accumulated in the reservoir 22 is fed back into the master cylinder 26.

When the hydraulic or oil pressure of the wheel cylinder 28 has been decreased (or increased) to a required value in due course, the three-position solenoid valve 18 cuts off both the communications of the wheel cylinder 28 with the master cylinder 26 and the reservoir 22 in accordance with a control signal delivered from the ABS computer 14. As a result, the hydraulic pressure of the wheel cylinder 28 is held.

Meanwhile, in a case where the hydraulic pressure of the wheel cylinder 28 needs to be increased, the three-position solenoid valve 18 brings the corresponding wheel cylinder 28 into communication with the master cylinder 26 as in the usual state of the antiskid brake system, in accordance with a control signal delivered from the ABS computer 14. In consequence, the oil in the master cylinder 26 is fed into the wheel cylinder 28, and a pressure increase control is executed. On this occasion, when the oil remains in the reservoir 22, it is lifted up by the pump 20 so as to be fed into the wheel cylinder 28.

In the present invention, the hardware construction of the antiskid brake system is not especially restrictive, but antiskid control systems having various known constructions other than the above construction can be adopted.

Now, controls which are executed in the ABS computer 14 will be explained.

Figure 6:
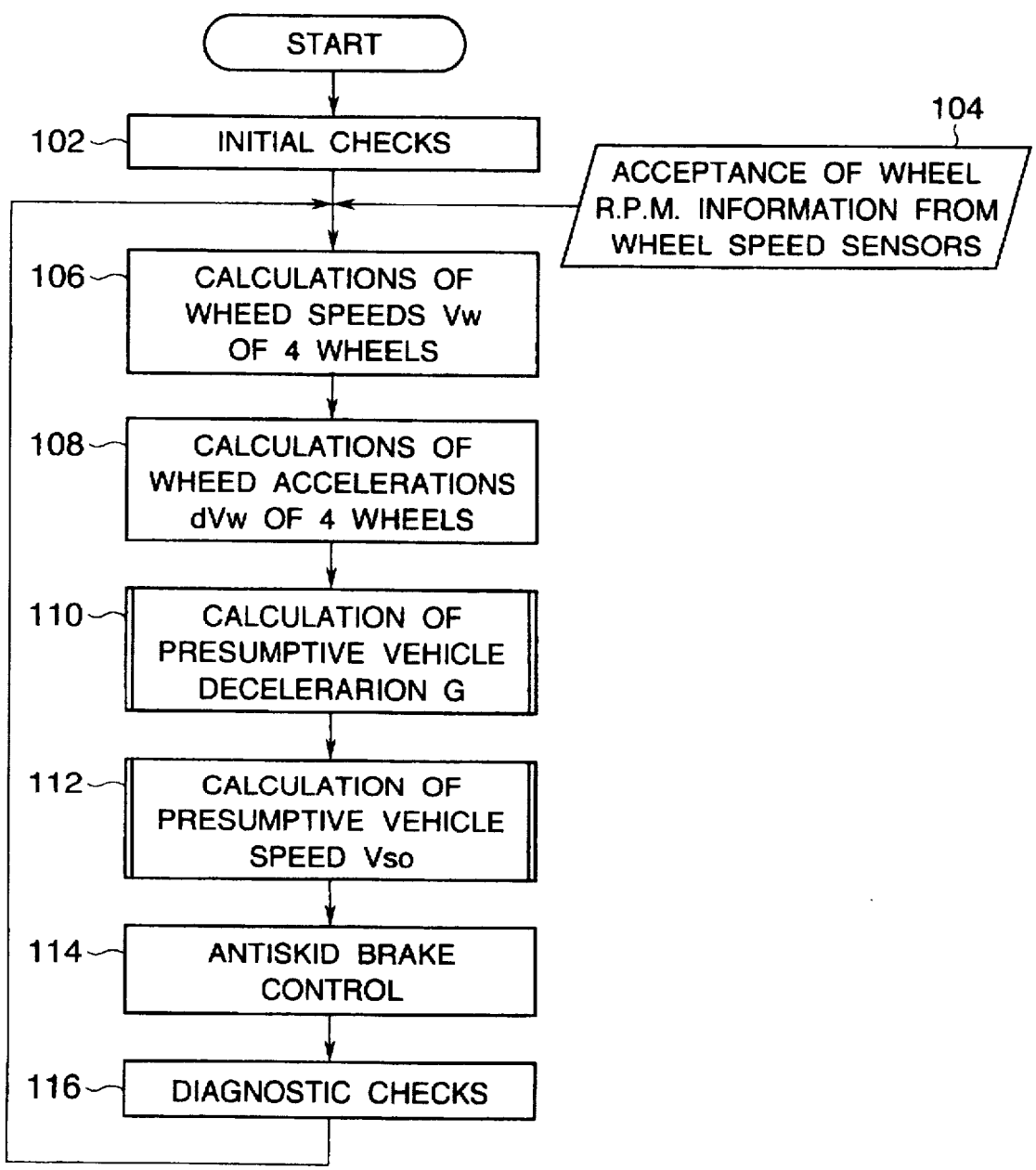
FIG. 6 is a flow chart showing a basic control flow which is run by an ABS (antiskid brake system) computer included in the antiskid brake system depicted in FIG. 5.

FIG. 6 illustrates the basic control flow of which the ABS computer 14 takes charge.

At a step 102, the ABS computer 14 executes initial checks (such as various initializations, and checking whether or not each sensor has any trouble).

At a step 106, the wheel speeds Vw (VwFR, VwFL, VwRR and VwRL) of the four wheels are respectively calculated on the basis of the wheel r.p.m. information items which have been accepted from the corresponding wheel speed sensors 12 by an interrupt operation 104. Besides, the wheel accelerations dVw (dVwFR, dVwFL, dVwRR and dVwRL) of the four wheels are respectively calculated from the wheel speeds Vw at a step 108.

Subsequently, at a step 110, the presumptive vehicle deceleration G is calculated from the wheel accelerations dVw. This calculation will be detailed later.

Further, at a step 112, the presumptive vehicle speed $V_{SO}$ is calculated using the wheel speeds Vw obtained at the step 106 or using the presumptive vehicle deceleration G obtained at the step 110. This calculation will also be detailed later.

Still further, at a step 114, the slip factor So of each wheel is evaluated from the presumptive vehicle speed $V_{SO}$ and the corresponding wheel speed Vw, and the known antiskid brake control is performed for the pertinent wheel on the basis of the slip factor So. Besides, known diagnoses are made at a step 116.

Here, the calculation of the presumptive vehicle deceleration G at the step 110 will be described in more detail.

Figure 7:
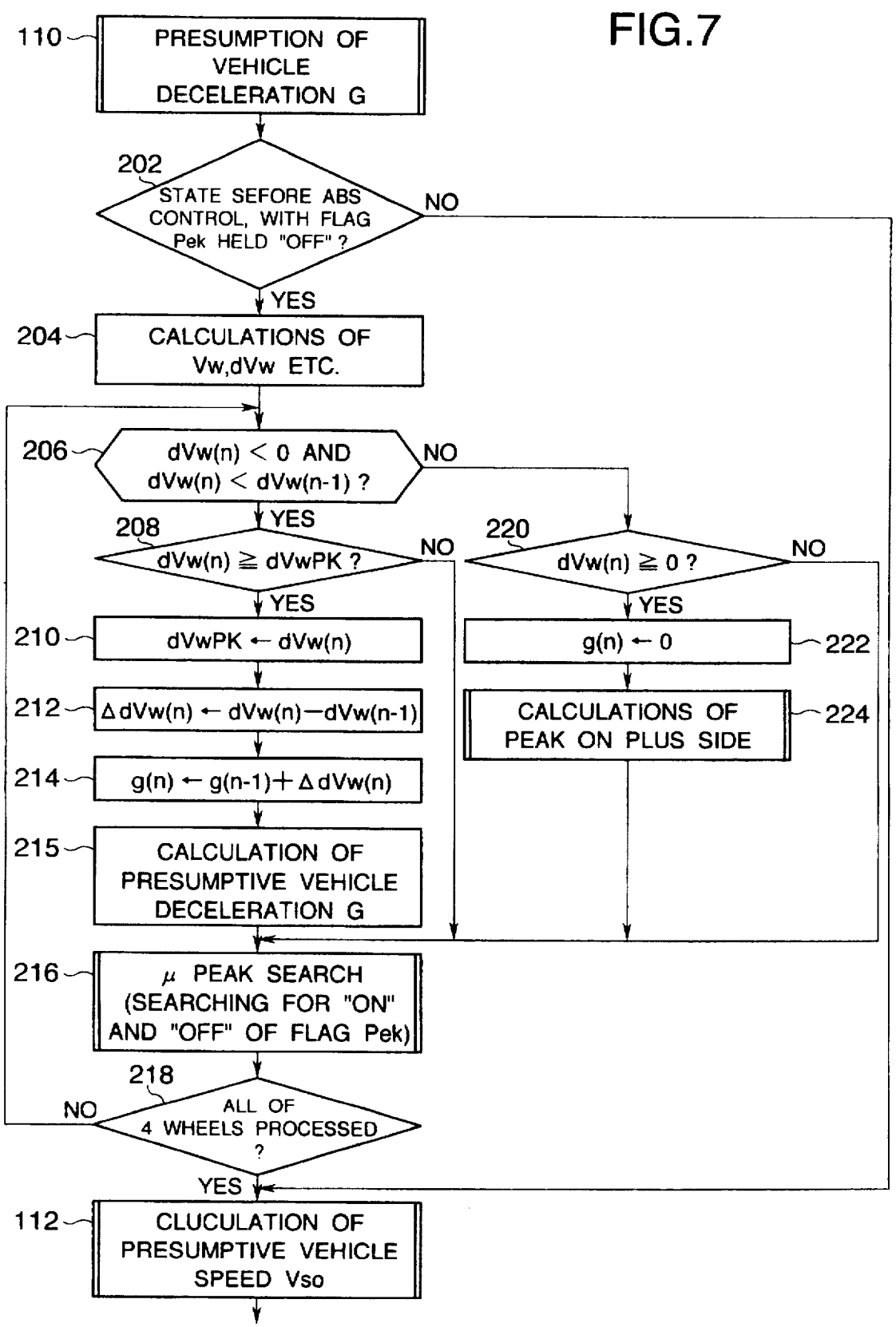
FIG. 7 is a chart showing a control flow for generating a presumptive vehicle deceleration.

FIG. 7 illustrates a control flow concerning the calculation of the presumptive vehicle deceleration G.

Incidentally, since the significances of individual calculations have already been detailed in the section of the summary of the present invention, the procedure of the presumption shall be chiefly explained here.

Figure 1:
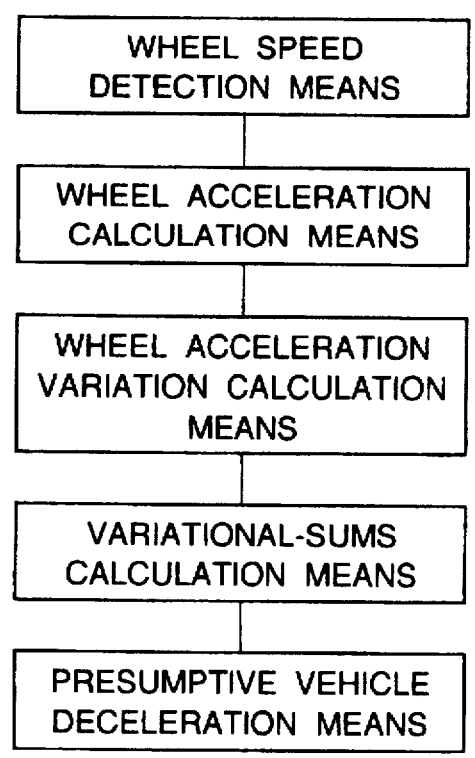
FIG. 1 is a block diagram showing the purport of the present invention.
Figure 2:
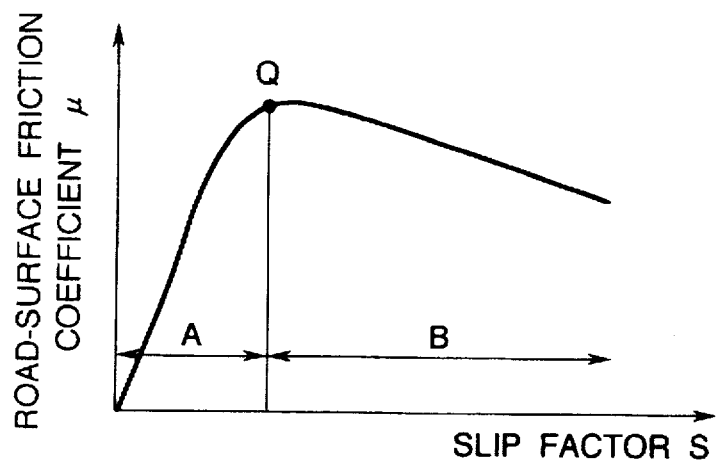
FIG. 2 is a graph showing the characteristics between friction coefficient and slip factor.
Figure 3:
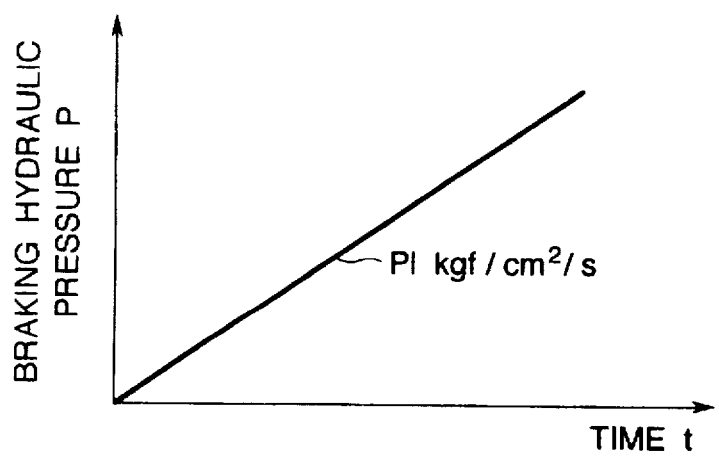
FIG. 3 is a graph showing the situation in which a braking hydraulic pressure rises.

At a step 202, the ABS computer (14 in FIG. 5) judges whether or not the state of the antiskid brake system is before the antiskid brake control (ABS control), and a flag Pek is held "off". The flag Pek is a flag which is turned "on" upon the judgement that the inflection point Q of the µ-S characteristics (in FIG. 2) has been exceeded. The details of this flag Pek will be explained later.

When the antiskid brake system is under the ABS control or when the flag Pek is "on", the vehicle deceleration G is not presumed, and hence, the presumptive vehicle speed $V_{SO}$ is calculated at the step 112 directly.

When it has been judged that the state of the antiskid brake system is before the ABS control and that the flag Pek is "off", the calculating routine proceeds to a step 204 et seq. in order to enter into the operation of presuming the vehicle deceleration G.

At the step 204, the wheel speeds Vw, wheel accelerations dVw etc. of the four wheels are calculated on the basis of the wheel r.p.m. information items accepted from the wheel speed sensors 12.

Figure 4:
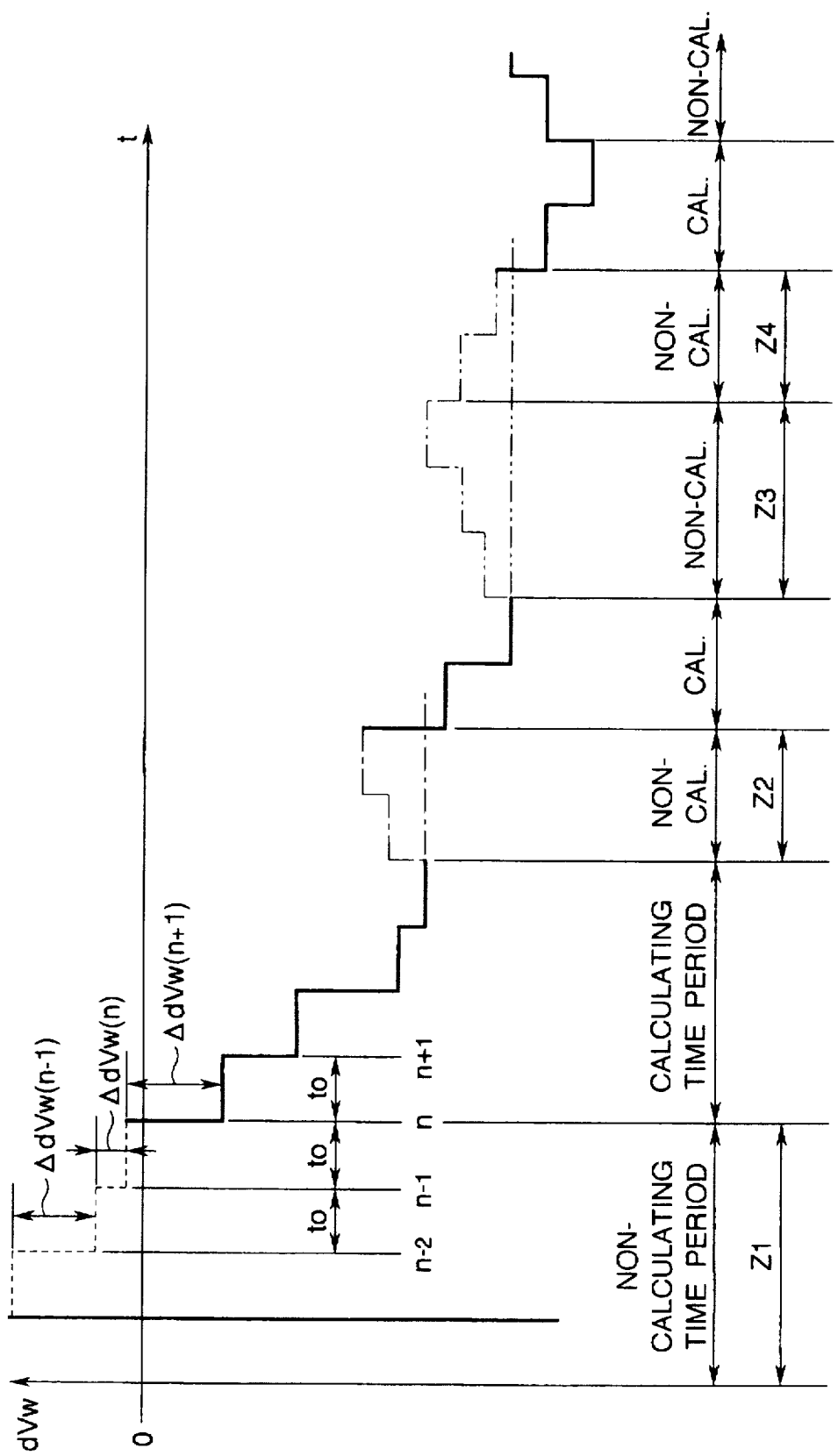
FIG. 4 is a graph showing the situation in which wheel accelerations change on and off.

At the next step 206, the ABS computer 14 judges whether or not the wheel acceleration dvw(n) calculated this time is minus and is smaller than the wheel acceleration dvw(n−1) calculated at the last time. This judgement is made in order that information items on a part Z1 indicated by a broken line in FIG. 4, and on a part Z2 or Z3 indicated by a dot-and-dash line in FIG. 4 may be omitted from data for the calculation of the vehicle deceleration G. The Part Z1 corresponds to an occasion where the wheel speed Vw is heightening. The part Z2 or Z3 corresponds to an occasion where the wheel speed Vw is lowering, but where the degree or ratio of the lowering is decreasing.

When it has been judged at the step 206 that the inequalities dvw(n)<0 and dvw(n)<dvw(n−1) are held, the calculating routine proceeds to a step 208, at which the ABS computer 14 judges whether or not the wheel acceleration dvw(n) is smaller than the minus peak dVwPK of the wheel acceleration dVw stored at the current point of time. When the wheel acceleration dvw(n) is not smaller (just as a part Z4 indicated by a two-dot chain line in FIG. 4), it is omitted from data for the G calculation.

When the inequality dvw(n)<dVwPK is held, the calculating routine proceeds to a step 210, at which the wheel acceleration dvw(n) calculated this time is updated as a new minus peak dVwPK.

Thereafter, at a step 212, the variation ΔdVw in the wheel acceleration dVw is calculated every wheel in accordance with the corresponding one of Eqs. (9) mentioned before. At a step 214, the variational-sums g(n) (which is the cumulative-sums of the variations ΔdVw in the wheel acceleration dVw) are calculated every wheel in accordance with the corresponding one of Eqs. (10).

In the case of calculating the variational-sums g(n) by the use of the corresponding equation (10), there might arise the drawback that, since the inertias of the car body and the wheel have greatly different values, the latest variation ΔdVw is reflected too much by utilizing the equation (10) left intact. More specifically, the vehicle speed exhibits a response rate of about 1.5~2 [Hz], whereas the wheel speed exhibits a response rate of about 10~50 [Hz]. Therefore, filtering may be performed in order to compensate for the difference of the response rates. By way of example, in the case of evaluating the variational-sum gFR(n) of the right front wheel, a quantity FgFR(n) filtered as indicated by the following equation (12) may be adopted as a variational-sum for use in the actual calculation:

$$FgFR(n) = \{7 \cdot gFR(n-1) + gFR(n)\}/8 \qquad (12)$$

Further, at a step 215, the presumptive vehicle deceleration G is calculated using these variational-sums g(n), concretely, the filtered variational-sums Fg(n), in accordance with Eq. (11) mentioned before.

Figure 9:
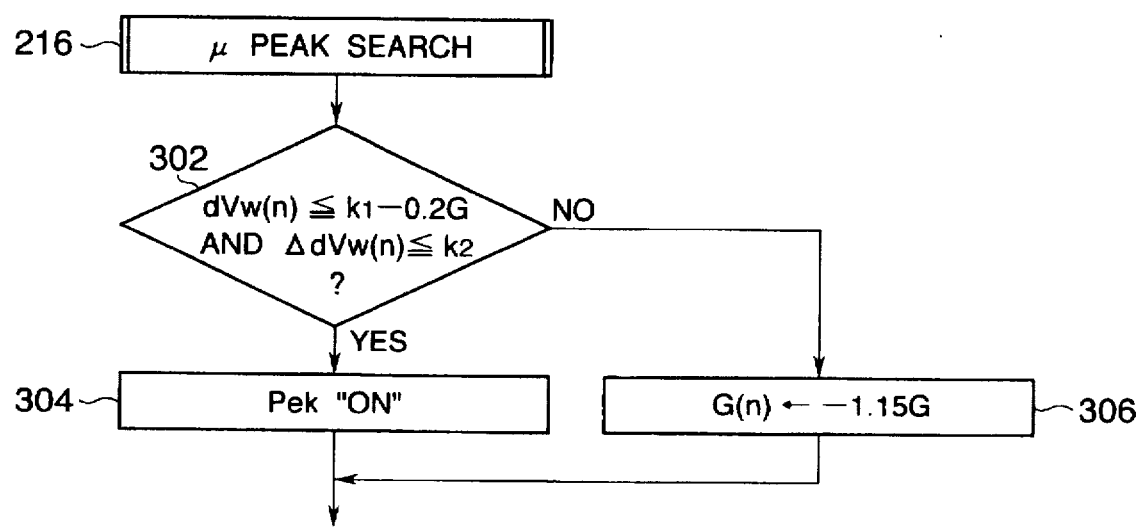
FIG. 9 is a chart showing a control flow which concerns a search for the inflection point of the characteristics as depicted in FIG. 2.

Thereafter, the inflection point Q of the µ-S characteristics (the µ peak) is searched for at a step 216. A practicable control flow for the μ peak search is illustrated in FIG. 9. Referring to the figure, at a step 302, in a case where the wheel acceleration dVw(n) is not greater than a value obtained by subtracting a predetermined deceleration 0.2 G from a predetermined vehicle speed variation value K1, and where the variation ΔdVw(n) in the wheel acceleration dVw(n) is not greater than a predetermined value K2, it is judged that the inflection point Q of the μ-S characteristics has been exceeded. In this case, the control flow proceeds to a step 304, at which the flag Pek is turned "on". In any other case, the control flow proceeds to a step 306, at which the presumptive vehicle deceleration G(n) is reset to a predetermined value −1.15 G.

The reasons for such processing are as stated below. It is considered that, while the wheel is slipping, the wheel acceleration dVw will be smaller than the variation $\Delta V_{SO}$ in the vehicle speed $V_{SO}$ (the variation $\Delta V_{SO}$ corresponds to the vehicle deceleration G, and to the predetermined value K1 in this embodiment). The subtraction of the predetermined deceleration 0.2 G is intended to avoid the influence of engine braking and to prevent malfunctions on a bad road and a high friction road and in a slow braking mode.

In addition, the condition that the variation ΔdVw in the wheel acceleration dVw is not greater than the predetermined value K2, is set for confirming the abrupt increase of the slip without fail.

Referring back to FIG. 7, whether or not all of the four wheels have been processed is judged at a step 218. In a case where the processing has not ended, the calculating routine returns to the step 206, at which the calculations on the pertinent wheel are iterated. At the point of time at which all of the four wheels have been processed, the calculating routine proceeds to the step 112 (in FIG. 6), at which the presumptive vehicle speed $V_{SO}$ is calculated. A practicable control flow for the $V_{SO}$ calculation will be explained later.

Meanwhile, when it has been judged at the step 206 that the wheel acceleration dVw(n) is zero or plus, or that the wheel acceleration dVw(n) at this time is equal to or greater than the wheel acceleration dVw(n−1) at the last time, the calculating routine proceeds to a step 220, at which whether or not the wheel acceleration dVw(n) is zero or plus is judged. When the wheel acceleration dVw(n) is zero or plus, the calculating routine proceeds to a step 222, at which the variational-sums g(n) are reset to 0 (zero).

Figure 10:
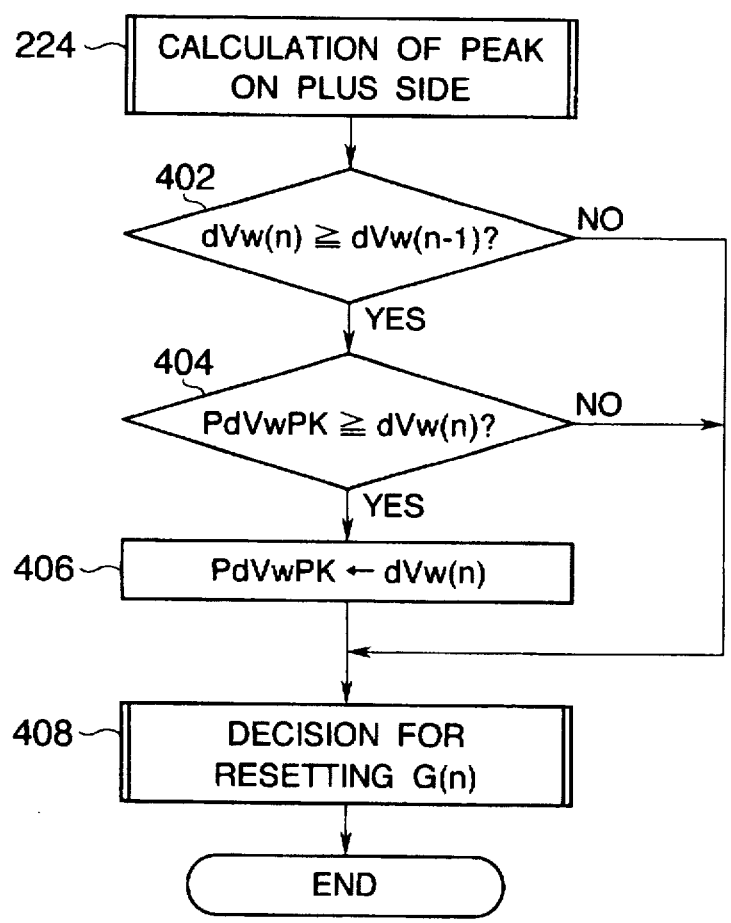
FIG. 10 is a flow chart showing a control flow for calculating the plus peak of the wheel acceleration.

Subsequently, at a step 224, the peak of the wheel acceleration dVw on the plus side thereof is calculated and is stored for updating. Concretely, the calculation conforms to a control flow as illustrated in FIG. 10. Referring to the figure, whether or not the wheel acceleration dVw(n) at this time is equal to or greater than the wheel acceleration dVw(n−1) at the last time is judged at the first step 402. In a case where the inequality dVw(n)≥dVw(n−1) is held, the calculating routine proceeds to a step 404, at which whether or not a peak value PdVwPK on the plus side hitherto stored is greater than the wheel acceleration dVw(n) at this time is judged. In a case where the peak value PdVwPK on the plus side is greater, it is set as the updated value at the next step 406.

Figure 11:
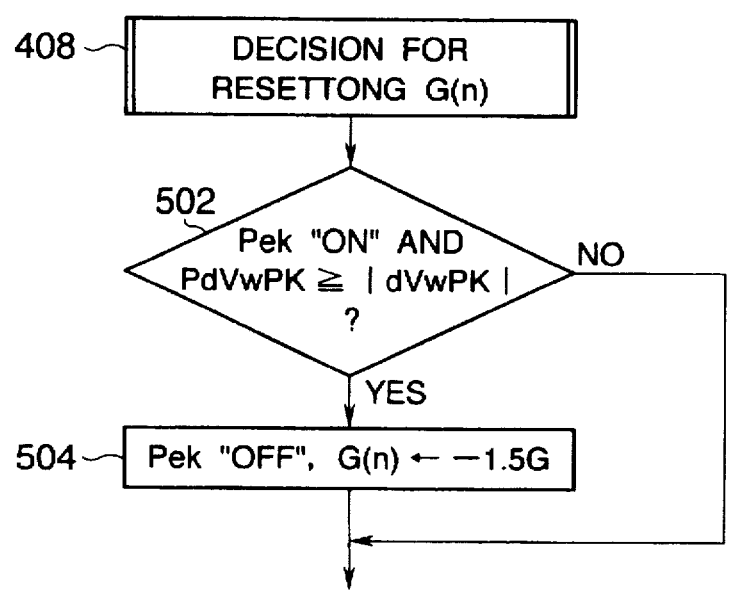
FIG. 11 is a chart showing a control flow for resetting the presumptive vehicle deceleration.
Figure 13:
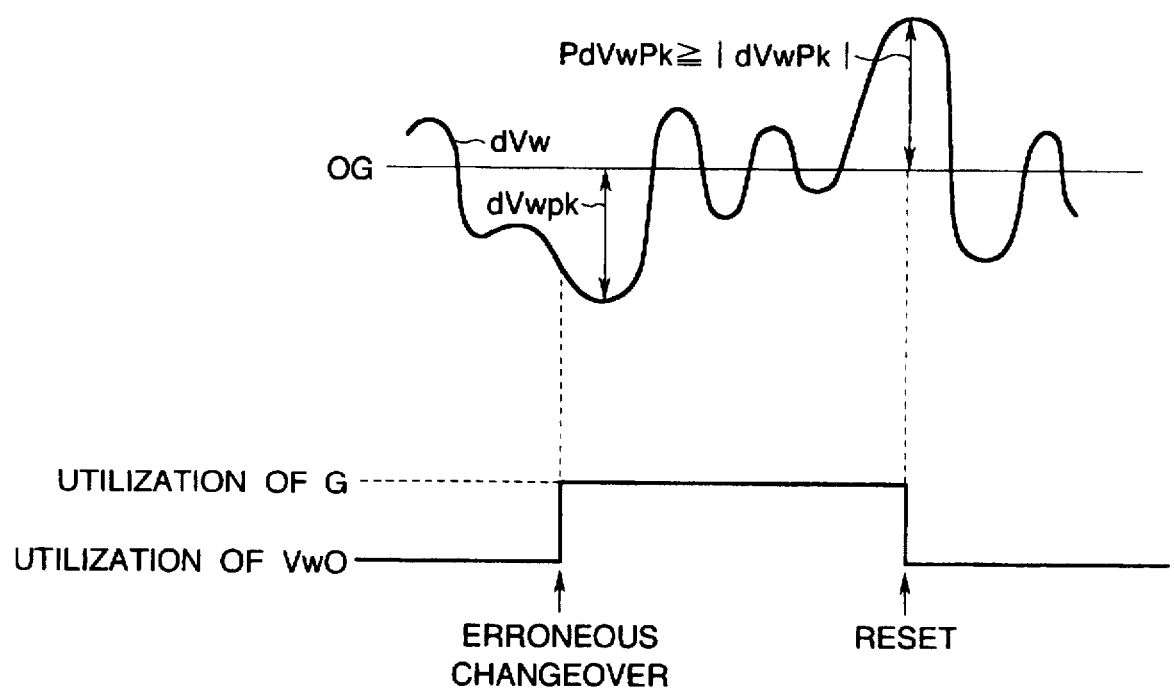
FIG. 13 is a graph showing the relationship between the plus peak and minus peak of the wheel acceleration.

At a step 408, a decision for resetting the vehicle deceleration G(n) is rendered. The resetting decision serves to reset the calculation of the presumptive vehicle deceleration G when the plus side peak PdVwPK of the wheel acceleration dVw has become or is greater than the absolute value of the minus side peak dVwPK thereof as indicated in FIG. 13. FIG. 11 illustrates a concrete control flow for resetting the presumptive vehicle deceleration. Referring to FIG. 11, at a step 502, the ABS computer 14 judges whether or not the flag Pek is held "on" and the plus side peak value PdVwPK is equal to or greater than the absolute value of the minus side peak value dVwPK. When both the requirements are held, the deciding routine proceeds to a step 504, at which the flag Pek is turned "off", and the presumptive vehicle deceleration G(n) is reset to the predetermined value −1.15 G.

Referring back to FIG. 6 again, when the presumptive vehicle deceleration G(n) has thus been calculated or set to the fixed value −1.15 G at the step 110, the presumptive vehicle speed $V_{SO}$ is calculated at the step 112 by the use of the obtained presumptive vehicle deceleration G(n). Concretely, the presuming calculation is executed in accordance with a control flow as illustrated in FIG. 12.

Figure 12:
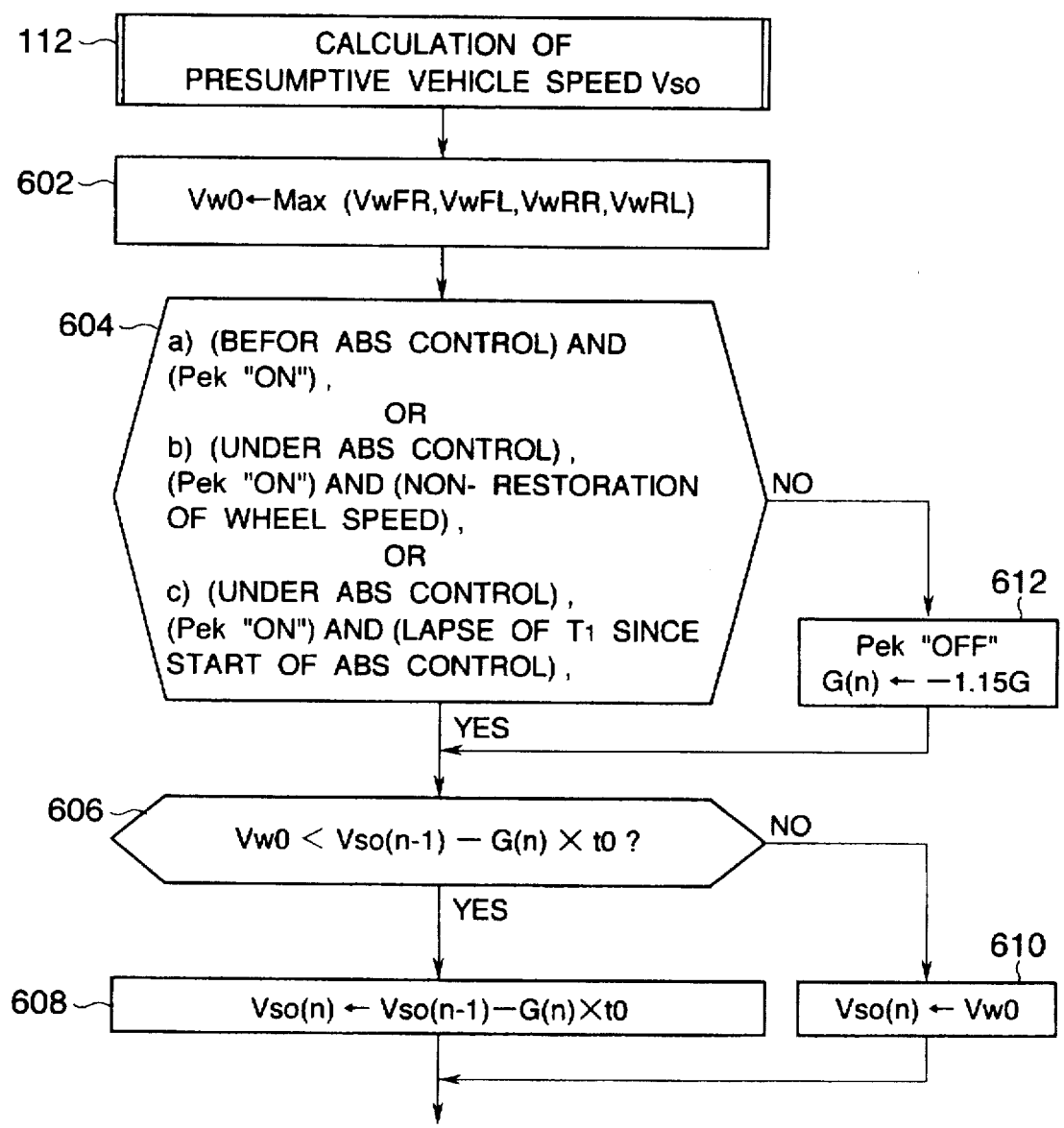
FIG. 12 is a chart showing a control flow for generating a presumptive vehicle speed.

Referring to FIG. 12, at a step 602, the highest wheel speed among the wheel speeds VwFR, VwFL, VwRR and VwRL of the four wheels is set as a selected wheel speed Vw0.

At a step 604, various conditions are confirmed in order to determine how the presumptive vehicle speed $V_{SO}$ is calculated (or set).

That is, whether or not any of the following three requirements is held is judged:

a) The state of the antiskid brake system is before the ABS control, and the flag Pek is held "on".

b) The state of the antiskid brake system is under the ABS control, the flag Pek is held "on", and the wheel speed is not restored (the wheel acceleration dVw is not plus, or the slip factor (rate) is greater than a fixed value).

c) The state of the antiskid brake system is under the ABS control, the flag Pek is held "on", and a predetermined time period T1 has lapsed since the start of the ABS control.

Here, in a case where any of the requirements a), b) and c) is held, the control flow proceeds to a step 606, at which the ABS computer 14 judges whether or not the selected wheel speed Vw0 is smaller than a difference obtained by subtracting (G(n)*t0) from the presumptive vehicle speed at the last time, $V_{SO}(n-1)$. Here, the multiplier t0 of the presumptive vehicle deceleration G(n) indicates a calculation cycle. When the selected wheel speed Vw0 is smaller than the difference, the value $(V_{SO}(n-1)-G(n)*t0)$ is set as the presumptive vehicle speed $V_{SO}$ (n) at a step 608. In contrast, when the selected wheel speed Vw0 is not smaller than the difference, the selected wheel speed Vw0 is set as the presumptive vehicle speed $V_{SO}(n)$ at a step 610.

Meanwhile, in a case where any of the requirements a), b) and c) is not held at the step 604, the control flow proceeds to a step 612. At this step 612, the flag Pek is turned "off"and besides the presumptive vehicle deceleration G(n) is reset to the predetermined value −1.15 G. Thereafter, the control flow proceeds to the step 606 et seq.

Figure 8:
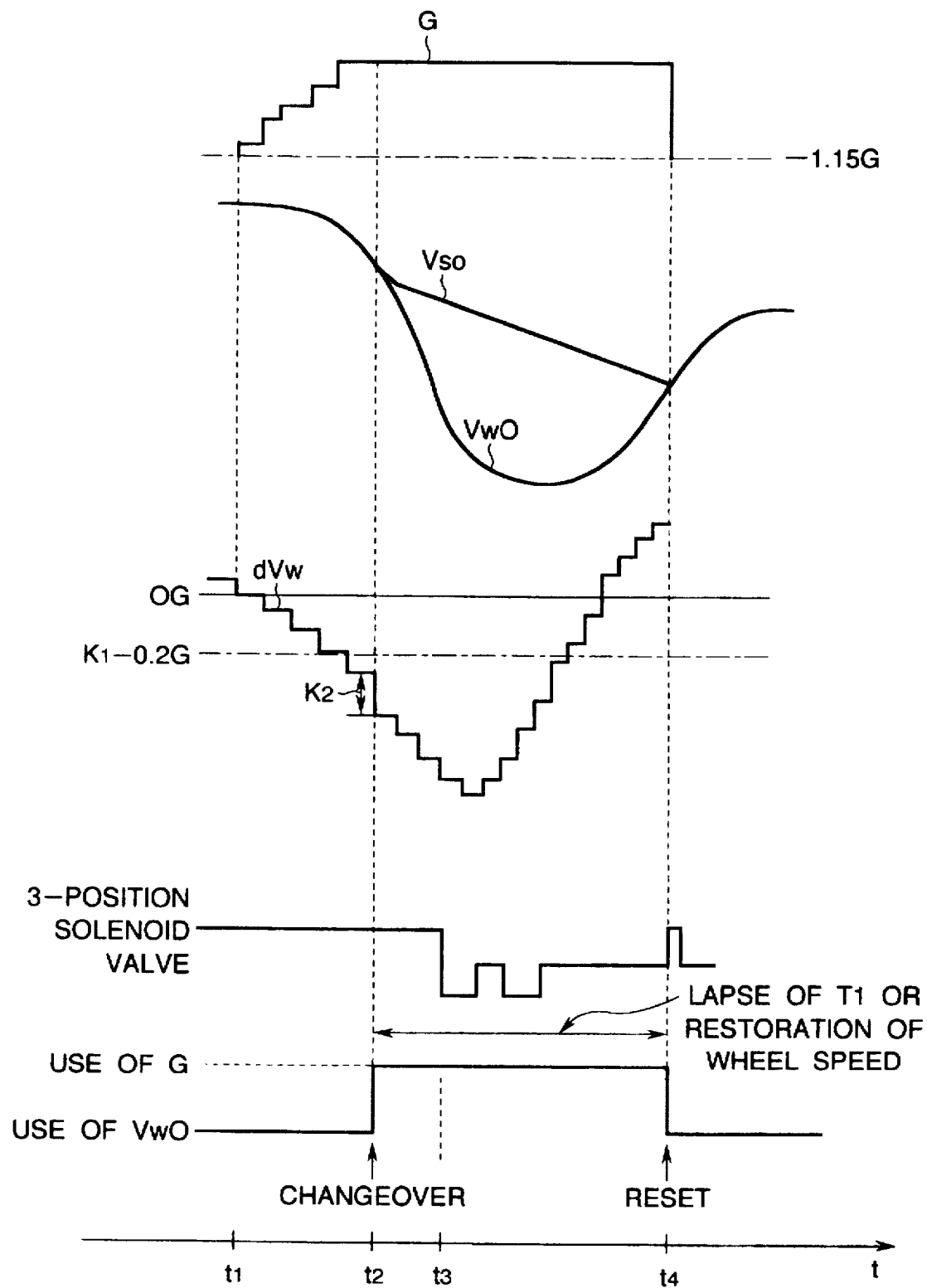
FIG. 8 is a graph showing the characteristics of various elements taken along a time base.

Incidentally, FIG. 8 exemplifies a graph in which the characteristics of the various elements based on this embodiment are depicted along a time base t.

As seen from FIG. 8, the presumptive vehicle deceleration G begins to be calculated at the point of time t1 at which the wheel acceleration dVw(n) calculated this time has been judged to be minus and to be smaller than the wheel acceleration dVw(n) calculated at the last time (step 206, FIG. 7).

Further, the flag Pek is turned "on" when it has been judged that the wheel acceleration dVw(n) is not greater than the difference value (K1−0.2 G) and that the variation ΔdVw(n) in the wheel acceleration dVw(n) is not greater than the predetermined value K2 (steps 302 and 304, FIG. 9). Besides, when it has been judged herein that the plus side peak PdVwPK of the wheel acceleration dVw is not smaller than the absolute value of the minus side peak dVwPK (step 502, FIG. 11), the to method of calculating the presumptive vehicle speed $V_{SO}$ is changed-over from the method based on the use of the selected wheel speed Vw0, to the method based on the use of the presumptive deceleration G (step 504, FIG. 11; point of time t2, FIG. 8).

Upon the judgement that the difference (in other words, the slip) between the presumptive vehicle speed $V_{SO}$ and the wheel speed Vw has consequently become to or greater than a predetermined value, the three-position solenoid valve 18 shown in FIG. 5 is controlled to carry out the ABS control (point of time t3, FIG. 8).

The calculation of the presumptive vehicle speed $V_{SO}$ conforming to the method based on the presumptive vehicle deceleration G is continued as long as the judgements are made that any of the requirements a), b) and c) at the step 604 in FIG. 12 is met and that the selected wheel speed Vw0 is smaller than the presumptive vehicle speed $V_{SO}$ (steps 606 and 608, FIG. 12). When the judgements have failed to be made, the $V_{SO}$ calculation is changed-over to the method based on the selected wheel speed Vw0 (point of time t4, FIG. 8).

Effects to be explained below are attained by calculating the presumptive vehicle deceleration G and the presumptive vehicle speed $V_{SO}$ in accordance with the control flows as stated above.

A presumptive vehicle deceleration can be calculated fundamentally from only wheel speeds without employing any acceleration sensor or acceleration switch. Therefore, increase in cost is not involved. It is also permitted through the utilization of the presumptive vehicle deceleration to accurately calculate a presumptive vehicle speed, particularly a presumptive vehicle speed after a wheel has begun to greatly slip in excess of the inflection point of μ-S characteristics. In turn, it is permitted to accurately detect a slip factor (rate) and to perform an antiskid brake control exactly to that extent.

Further, the presumptive vehicle deceleration is calculated by adding up the variational-sums (namely the cumulative-sums of variations in the wheel accelerations of all wheels). Therefore, arithmetic processing for the calculation is simple and easy, and the influences of the four wheels can be appropriately reflected on the presumptive vehicle deceleration.

Still further, in calculating the variational-sums, filtering is effected for correcting or compensating the difference between the response rates of the vehicle speed and the wheel speed. Therefore, the change of the wheel acceleration can be precisely reflected on the presumption of the vehicle deceleration.

Yet further, the vehicle deceleration is presumed in a case where the wheel acceleration is minus and where the variation in the wheel acceleration is minus. Therefore, the vehicle deceleration can be calculated only when the wheel acceleration contributes thereto. Thus, the load of the presuming calculation can be lightened. Also, chances for the mixing of noise components can be reduced, and the vehicle deceleration can be presumed accurately to that extent.

Besides, in calculating the variational-sums, only variational data generated in the state in which the variation in the wheel acceleration is minus and in which the current wheel acceleration has a value smaller than the minus side peak of the wheel acceleration stored and updated before, is used as data for the calculation of the variational-sums. It is therefore permitted to accept only information which ought to be truly reflected on the vehicle deceleration, after vibrations and other disturbance components have been effectively excluded.

In addition, when it is judged that the wheel acceleration has become plus, the variational-sums calculated before is reset. Therefore, the influences of, e. g., vibrations ascribable to the elastic reformation of the rubber of a tire can be excluded, and the accurate presumption of the vehicle deceleration is possible.

Moreover, when it has been judged from the variation in the wheel acceleration that the inflection point of the μ-S characteristics has been exceeded, the presuming calculation of the vehicle speed is changed-over so as to use the presumptive vehicle deceleration. Therefore, increase in cost is not involved (because the inflection point of the characteristics can be accurately detected without using an acceleration sensor or the like). Also, as long as the inflection point of the characteristics has not been exceeded, the vehicle speed presumption which is based on the highest wheel speed (this presumption has heretofore been known and is reliable) can be employed, and hence, the vehicle speed can be accurately presumed both before and behind the inflection point of the characteristics.

Furthermore, when the variation in the wheel acceleration has become plus, the variational-sums stored before are reset. Therefore, increase in the wheel acceleration (rise in the wheel speed) can be exactly grasped, and the presuming calculations of the wheel speed can be smoothly changed-over, before and behind the inflection point of the μ-S characteristics.

Furthermore, when the plus side peak of the wheel acceleration has become equal to or greater than the absolute value of the minus side peak thereof, the presumptive vehicle deceleration is reset to a fixed value. It is therefore possible to accurately detect that the wheel acceleration has been recovered certainly, not by the influence of the vibrations of the tire, etc., and to reliably reflect the recovery on the presumption of the vehicle speed.

It is needless to say that the practicable constructions, numerical values etc. stated in the above embodiment are not especially restrictive, but that they can be properly altered within the scope of the purport of the present invention.

As described above, the present invention can bring forth the effect that a vehicle deceleration can be presumed at a high precision without employing any of an acceleration switch, an acceleration sensor, etc., and that a vehicle speed can be consequently presumed at a high precision. Thereby an antiskid brake control of high precision can be proceed at low cost.

What is claimed is:

1. A vehicle deceleration presumption system for a motor vehicle, said motor vehicle having wheels, comprising:
   wheel speed detection means mounted on said wheels respectively, for detecting wheel speeds of the respective wheels;
   wheel acceleration calculation means for calculating wheel accelerations of said respective wheels from said wheel speeds;
   wheel acceleration variation calculation means for calculating variations in said wheel accelerations of the respective wheels from said wheel accelerations;
   variational-sums calculation means for calculating cumulative sums of said variations in the wheel accelerations of the respective wheels from said variations; and
   presumptive vehicle deceleration calculation means for calculating a presumptive vehicle deceleration from said cumulative sums of the variations in the wheel accelerations of the respective wheels.

2. A vehicle deceleration presumption system for a motor vehicle as defined in claim 1, further comprising:

means for judging if said wheel acceleration is minus; and means for judging if said variation in the wheel acceleration is minus;

wherein said vehicle deceleration is presumed only in a case where said wheel accelerations are minus and where said wheel acceleration variations are minus.

3. A vehicle deceleration presumption system for a motor vehicle as defined in claim 2, further comprising:

means for storing and updating a peak of said wheel acceleration on a minus side thereof;

wherein in calculating said cumulative sums of the variations in the wheel accelerations, only variation data generated in a state in which said variation in the wheel acceleration is minus and in which the current wheel acceleration has a value smaller than said minus side peak of the wheel acceleration stored and updated before, is used as data for said calculation of the cumulative sum of the variations.

4. A vehicle deceleration presumption system for a motor vehicle as defined in claim 2, wherein upon the judgement that said wheel acceleration has become plus, by said means for judging if said wheel acceleration is minus, said cumulative sum of the wheel acceleration variations calculated before is reset.

5. A vehicle deceleration presumption system for a motor vehicle as defined in claim 1, wherein said presumptive vehicle deceleration calculation means calculates the presumptive vehicle deceleration by adding up said cumulative sums of the variations in the wheel accelerations of all of said respective wheels.

6. A vehicle deceleration presumption system for a motor vehicle as defined in claim 1, wherein said variational-sums calculation means includes filtering means so as to perform filtering in calculating said cumulative sums of the wheel acceleration variations.

7. A vehicle speed presumption system for a motor vehicle, said motor vehicle having wheels, comprising:

wheel speed detection means mounted on said wheels respectively, for detecting wheel speeds of the respective wheels;

wheel acceleration calculation means for calculating wheel accelerations of said respective wheels from said wheel speeds;

wheel acceleration variation calculation means for calculating variations in said wheel accelerations of the respective wheels from said wheel accelerations;

variational-sums calculation means for calculating cumulative sums of said variations in the wheel accelerations of the respective wheels from said variations;

presumptive vehicle deceleration calculation means for calculating a presumptive vehicle deceleration from said cumulative sums of the variations in the wheel accelerations of the respective wheels; and presumptive vehicle speed calculation means for calculating a presumptive vehicle speed of the motor vehicle by using said presumptive vehicle deceleration.

8. A vehicle speed presumption system for a motor vehicle as defined in claim 7, further comprising:

means for judging if an inflection point of "road-surface friction coefficient—slip factor characteristics" has been exceeded, from said variation in the wheel acceleration;

wherein upon the judgement that said inflection point of the characteristics has been exceeded, the presumption of the vehicle speed is changed-over so as to be done using said presumptive vehicle deceleration calculated by said presumptive vehicle deceleration calculation means.

9. A vehicle speed presumption system for a motor vehicle as defined in claim 8, further comprising:

means for judging if said variation in said wheel acceleration is plus;

wherein upon the judgement that the wheel acceleration variation has become plus, said cumulative sums of the wheel acceleration variations generated after said changeover to the presumption of said vehicle speed by the use of said presumptive vehicle deceleration are reset.

10. A vehicle speed presumption system for a motor vehicle as defined in claim 8, further comprising:

means for detecting peaks of absolute values of said wheel acceleration on a plus side and a minus side thereof;

wherein when the absolute value of the plus side peak has become to or greater than that of the minus side peak, the vehicle speed presumption using said presumptive vehicle deceleration is suspended.

11. An antiskid brake system for a motor vehicle, said motor vehicle having wheels, comprising:

wheel speed detection means mounted on said wheels respectively, for detecting wheel speeds of the respective wheels;

wheel acceleration calculation means for calculating wheel accelerations of said respective wheels from said wheel speeds;

wheel acceleration variation calculation means for calculating variations in said wheel accelerations of the respective wheels from said wheel accelerations;

variational-sums calculation means for calculating cumulative sums of said variations in the wheel accelerations of the respective wheels from said variations;

presumptive vehicle deceleration calculation means for calculating a presumptive vehicle deceleration from said cumulative sums of the variations in the wheel accelerations of the respective wheels;

presumptive vehicle speed calculation means for calculating a presumptive vehicle speed of the motor vehicle by using of said presumptive vehicle deceleration;

slip factor calculation means for calculating slip factors of said respective wheels from said calculated presumptive vehicle speed and said wheel speeds; and braking force control means for controlling braking forces of said respective wheels in accordance with said slip factors.

* * * * *